A. Z. ROTHSCHILD.
METHOD OF OBTAINING FIBER FROM COCOANUT HUSKS.
APPLICATION FILED JAN. 17, 1914.
1,111,405. Patented Sept. 22, 1914.
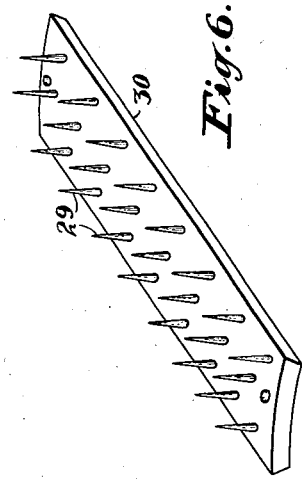
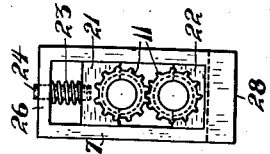
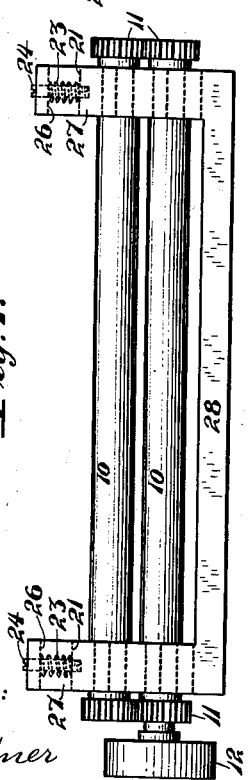
WITNESSES:
F. C. Fliedner
G. M. Ball
INVENTOR,
Alexander Z. Rothschild,
BY Francis M. Wright
ATTORNEY

UNITED STATES PATENT OFFICE.

ALEXANDER Z. ROTHSCHILD, OF SAN FRANCISCO, CALIFORNIA.

METHOD OF OBTAINING FIBER FROM COCOANUT-HUSKS.

1,111,405.

Specification of Letters Patent. Patented Sept. 22, 1914.

Application filed January 17, 1914. Serial No. 812,719.

*To all whom it may concern:*

Be it known that I, ALEXANDER Z. ROTHSCHILD, a citizen of the United States, residing at San Francisco, in the county of San Francisco and State of California, have invented new and useful Improvements in Methods of Obtaining Fiber from Cocoanut-Husks, of which the following is a specification.

The object of the present invention is to provide an improved process of obtaining fiber from cocoanut husks.

In the accompanying drawing, Figure 1 is a vertical section of a steam chamber; Fig. 2 is a side view of a crushing apparatus; Fig. 3 is an end view of apparatus for converting the crushed husk into fiber; Fig. 4 is a front view of a feeder used in the latter apparatus; Fig. 5 is an end view thereof; Fig. 6 is a perspective view of a detached section of a picking wheel.

In carrying out my invention, the husks 1 of the cocoanut are placed in a steam box or chamber 2, having suitable inlet and outlet pipes 3, 4, for the steam, and are subjected to the action of the steam for a period of not less than six hours. By this means said husks are softened and rendered fit for the action of the crushing apparatus shown in Fig. 2, which comprises cylinders 6 rotatably mounted in stationary bearings upon a frame 7, one of said cylinders being rotated by means of a belt 8 from any suitable source of power. The softened husks, passed between the two cylinders, are strongly compressed and elongated thereby and emerge from between the cylinders in the form of long, flat strips 9. These strips 9 are passed between the cylinders 10 of a feeder, shown in detail in Figs. 4 and 5, said cylinders having at both ends gear wheels 11 meshing with each other, whereby they rotate in unison, and the lower cylinder having a pulley 12 adapted to be rotated by a belt 13 around a pulley 14 on a shaft 15 in bearings 16 on a frame 17 supporting the feeder, said shaft 15 being rotated by means of a pulley 18 driven by a belt 19 from any suitable source of power. The shafts of said feeder cylinders rotate in half-round oppositely facing bearings 21, 22, the upper bearings 21 being pressed toward the lower bearings 22 by means of coiled springs 23 around stems 24 secured in said upper bearings and slidable through guides in the tops 26 of end members 27 of the feeder frame 28, said springs being compressed between said upper bearings and tops. As each husk passes between said feeder cylinders 10 and to the rear thereof, its advancing end is impinged upon by spikes or pickers 29 secured to picker sections 30 secured to a cylinder 31 connected by spokes 32 to a hub 33 on said shaft 15, a shield 34 surrounding the upper portion of said picker cylinder. These spikes or pickers, moving much more rapidly than the projecting ends of the husks, impinge upon said husks and comb the same into separate long fibers, shown at 36, while short fibers 37 and small particles drop therefrom into a hopper 38, from which they descend into a chamber 39, in which rotates a wheel 41, having radially extending vanes 42, and rotating by means of a belt 43, which wheel causes the short fibers to descend in a chute 44, while the small particles fall on to a screen 46 forming the bottom of the chamber 39 and pass through said screen into a chamber 47, from which they can be removed periodically. When each husk has been advanced one-half its length through the cylinders 10 and subjected to the picking action of the pickers, it is withdrawn by hand, and the other half of the husk is in like manner inserted between the cylinders and subjected to said picking action. By the above picking action the short fibers and fine particles are separated from the long fibers, the latter being retained in the hand, while the former fall into the chamber 39 in which the short fibers are separated from the fine particles and dust.

I claim:—

1. The method of obtaining fiber from cocoanut husks which consists in exposing the husk to contact with steam, then powerfully crushing the husk, and then holding each end of the husk alternately while simultaneously picking the remainder thereof.

2. The method of obtaining fiber from cocoanut husks which consists in exposing the husk to contact with steam, then powerfully crushing the husk, and then holding each end of the husk alternately while simultaneously picking the remainder thereof, thereby removing from the husk all except the long fibers, and then dividing the removed portion into short fibers and fine particles.

In testimony whereof I have hereunto set my hand in the presence of two subscribing witnesses.

ALEXANDER Z. ROTHSCHILD.

Witnesses:
 FRANCIS M. WRIGHT,
 D. B. RICHARDS.